Oct. 29, 1963     T. G. BOMAN     3,108,548
PIE MARKER AND CRIMPER
Filed Dec. 12, 1960
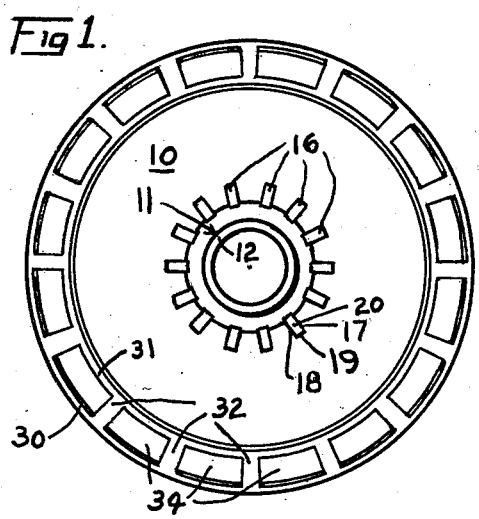
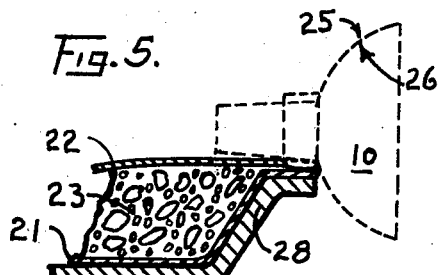
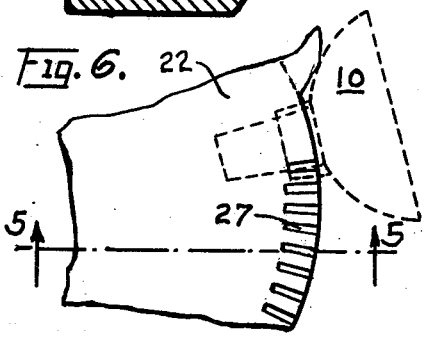
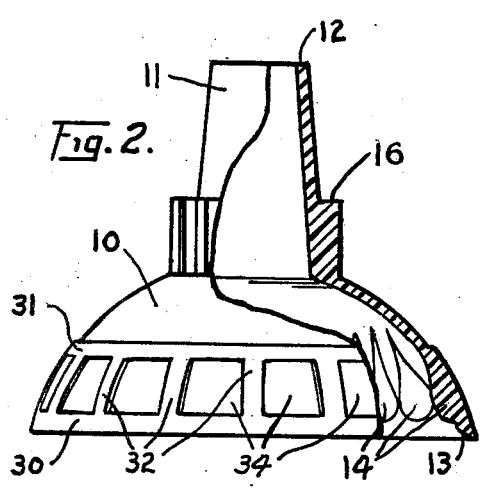
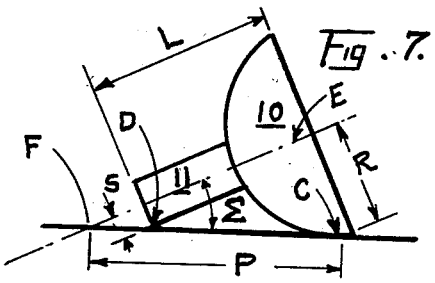
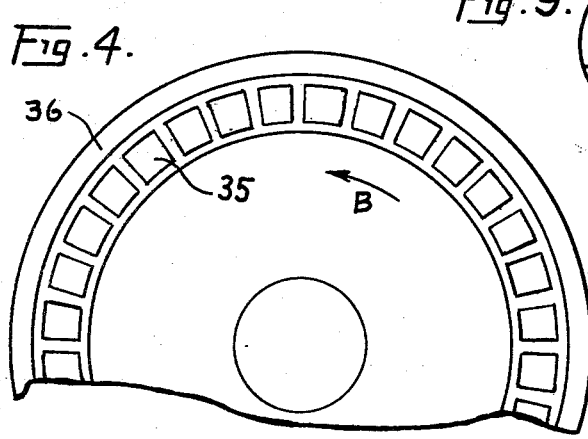
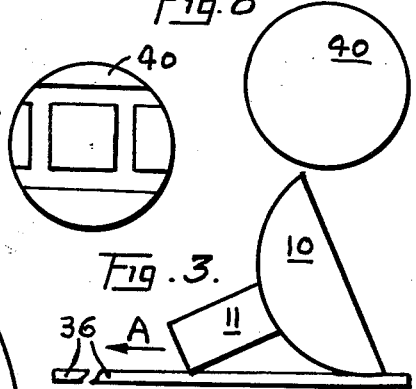
INVENTOR.
Thomas G. Boman

3,108,548
PIE MARKER AND CRIMPER
Thomas G. Boman, 164 Broadway St., Pataskala, Ohio
Filed Dec. 12, 1960, Ser. No. 75,192
1 Claim. (Cl. 107—49)

This invention relates generally to culinary tools and more particularly to a kitchen article which has among its more uses those of marking out the dimensions of and the designs on dough or the like, decorating the same, cutting, pressing and forming the same.

A primary object of my invention is the provision of a dough marker whereby a circle or a portion thereof may be scribed or indicated upon the flattened dough. And, if desired, pressure may be exerted upon the dough in desired areas by a rolling action of the marker. And, pressure may be exerted at the inner end of the dough marker to circularly mark or cut the dough. It is to be noted that the marking elements are so made as to preclude slippage or sliding of the utensil either endwise or laterally.

Another object of my invention is the provision of a pie dough cutter and crimper which utilizes a convex surface to engage the edge of the pie tin thereby shearing the dough and also serving to guide the teeth of the utensil during their crimping, sealing and decorating action.

My kitchen utensil has no moving parts and is simple, durable and efficient, and may be manufactured and sold at a comparatively low cost. Also, it is neat and sanitary.

Another feature is the square or right angle end surface at the small end of the utensil whereby endwise movement of the utensil is prevented and also this type of end cuts out the small decorative discs of dough with very smooth edges and also releases them readily.

With these and other objects in view as will become more apparent as the description proceeds, the invention consists in certain novel features of construction, combination and arrangement of parts as will be more fully described and claimed.

For a complete understanding of my invention, reference is to be had to the following description and accompanying drawing, in which:

FIG. 1 is a top plan view of a utensil or tool constructed in accordance with my invention.

FIG. 2 is a side view of the utensil, parts being broken away to expedite the showing.

FIG. 3 shows a formed or partially formed blank of pastry with my utensil positioned thereon.

FIG. 4 is a plan view of FIG. 3 showing the marking created by rolling movement of the utensil, this action giving a true circle.

FIG. 5 shows a fragmentary sectional view of a partly completed pie, this view being taken along line 5—5 of FIG. 6.

FIG. 6 is a fragmentary plan view of a partly completed pie.

FIG. 7 is a diagrammatic view illustrating the relationship of the several dimensions of my utensil with respect to the size of the scribed circle.

FIG. 8 shows a plan view of a pastry or confection ready for decoration either before or after cooking or baking.

FIG. 9 shows one type of decoration added to FIG. 8.

Referring to the drawing, numeral 10 indicates a shell-like body of cup shape and numeral 11 is a hollow stem integrally formed therewith to form a utensil of funnel shape as shown in FIG. 2.

As is shown in FIGS. 1 and 2, the open end of the stem 11 is formed with its end surface 12 at right angles to its longitudinal axis whereby it will tend to prevent movement of the utensil in the direction of the arrow A. See FIG. 3.

The body 10, see FIG. 2, terminates at its lower and open end in a shearing edge 13 of 30° to the horizontal whereby there is little inward movement of the dough or pastry during the shearing action. This makes for better decorating and sealing action on the dough blank. This is accomplished as follows. A series of protuberances 14, circumferentially located, provide the means for decorating the edges of single cookies while being cut out, or for both decorating and sealing the edges of filled cookies while being made as is well understood by those skilled in this art.

Exteriorly of the juncture of the stem 11 and the body 10 teeth 16 are formed. See FIGS. 1 and 2. These teeth 16 are formed by parallel side surfaces 17 and 18, a flat top surface 19 at right angles to the said side surfaces. An end surface 20 is at right angles to each of the previously mentioned surfaces whereby a much better action, upon the dough being worked upon, is obtained. The square corners give a good forming effect on the dough or pastry as the square angled surfaces tend to move it in definitely different directions.

In FIG. 5, numeral 28 indicates a pie tin carrying a lower pie crust 21, an upper crust 22, and filling 23 therebetween. The utensil is shown in dotted lines. The user of the utensil may grasp the same in various ways as desired. For example, the thumb of the user may be located at 25, the fingers at 26, manipulation being by an oscillatory motion, during which portions of the convex body 10 engage any overhanging pastry and shear it off. See FIG. 6.

Also, the teeth 16 are pressed and rolled into the pastry to form the sealing between the lower pie crust 21 and the upper pie crust 22 as indicated at 27. See FIG. 6. Or, if desired, after the trimming of the excess pastry dough the crimper may be conveniently rolled completely around the pie tin to seal and crimp and decorate the pastry. And, the utensil may be used to simply trim and decorate the crust of an open top pie.

As shown in FIG. 1, the body 10 may carry a raised concentric rib 30 positioned adjacent its lower edge, a second raised concentric rib 31 spaced upwardly therefrom, with vertical connecting ribs 32, the outer surfaces of these several sets of ribs being of arcuate configuration corresponding to the cup shape of the shell like body 10.

Referring now to FIGS. 3 and 4, numeral 36 indicates the dough more or less flattened to shape. Thus, when the utensil is located as shown in FIG. 3, and rolled, as indicated by the arrow B, see FIG. 4, its path will be concentric and pressure downwardly thereon will cause the smaller stem end to scribe a circle in the dough 36, even cutting it completely out if desired, and the larger end to not only scribe the calculated predetermined circle but also to compress and decorate the edge as desired.

It is to be understood that the several ribs enter into the dough more or less, depending upon the exerted pressure, and by thus gripping the same keep the utensil from slipping or skidding sideways in the direction of the arrow B. See FIG. 4. Also these ribs aid in preventing lengthwise movement of the utensil.

And, during the initial rolling of the dough from its ball state, its extending periphery may be gauged by simply performing the above described rolling procedure thereby permitting proper alteration of the dough by either bodily transfer of a small portion of the dough or by corrective rolling. That is, by proper gauging, and correction, one can easily roll the true sized circle of dough as desired.

The several ribs 30, 31 and 32 form a series of substantially rectangular depressed areas 34 and the concentric design 35, see FIG. 4, is attained when the utensil is utilized by rolling and pressing downwardly thereon.

As shown in FIG. 7, the body of my utensil 10 contacts the dough surface in tangent relationship at C and letter D indicates the contact of the stem 11. F indicates the point at which the axis E of the utensil intersects the plane of the dough and this is the center of rotation.

R is the radius of the body, S is the radius of the stem, and L is the length of the utensil. P indicates the radius of the scribed circle. $\Sigma$ is the angle the axis makes with the horizontal.

Assuming R is 2", S is 3/8" and L is 3", then R minus S over 3 is the tangent of the angle $\Sigma$. That is, R minus S gives 1 and 5/8. Now 1 and 5/8 divided by 3 is about 0.542 and thus, from mathematical tables, this fraction 0.542 is the function of the angle 28° approximately. In other words, 0.542 is the tangent of an angle of about 28°.

From FIG. 7, it can be understood that P is cosecant times 2 which gives about 4¼ inches, thus giving a diameter of 8½ or 9 inches. Thus this is the size of the scribed circle. Thus the user can easily estimate any size desired.

FIG. 8 indicates a pastry, sweet, or candy 40 capable of receiving an impression.

FIG. 9 indicates the same after my utensil is rolled thereacross with suitable pressure. By rolling the decorative strip in various directions and at different angles different and pleasing designs may be produced. Powdered sugar or the like can be added over the decorated surface and then laterally brushed away from the higher areas thus bringing out various pleasing and decorative colors and high lights.

The various advantages and objects of my invention may be accomplished by modifications of the particular method and embodiment specifically described herein, and it is intended that the appended claim shall include all equivalent arrangements and methods fairly coming within their call.

Having thus described my invention, what I claim as new and desire to protect by Letters Patent is:

A marking, cutting and crimping kitchen utensil for use with dough, consisting of a hollow tube-like member with open ends, one end being of maximum diameter, the other end being of minimum diameter, the intermediate portion being restricted in its diameters whereby the utensil can freely roll when placed on a flat surface, such as a sheet of dough, with its ends in contact therewith, protruding circumferentially extending rib means located exteriorly upon the said member adjacent its maximum diameter end to mark arcuately upon said sheet of dough and pie crimping means located exteriorly around the said tube-like member at a point between its ends.

References Cited in the file of this patent
UNITED STATES PATENTS

| | | |
|---|---|---|
| 468,071 | Moore | Feb. 2, 1892 |
| 719,043 | Reminger | Jan. 27, 1903 |
| 907,456 | Butler | Dec. 22, 1908 |
| 2,598,626 | Wangeman | May 27, 1952 |
| 2,694,987 | Kappler | Nov. 23, 1954 |